United States Patent [19]

Schenk

[11] 4,067,090
[45] Jan. 10, 1978

[54] FASTENER

[75] Inventor: Peter Schenk, West Islip, N.Y.

[73] Assignee: Dzus Fastener Co., Inc., West Islip, N.Y.

[21] Appl. No.: 647,093

[22] Filed: Jan. 7, 1976

[51] Int. Cl.² .................................................. A44B 17/00
[52] U.S. Cl. .................................. 24/221 K; 24/221 R
[58] Field of Search ............ 24/221 K, 221 R, 221 A, 24/73 RM; 85/5 P

[56] References Cited

U.S. PATENT DOCUMENTS

| 1,666,783 | 4/1928 | Kries | 85/5 P |
|---|---|---|---|
| 2,123,068 | 7/1938 | Summers | 24/221 A |
| 2,339,591 | 1/1944 | Weber | 24/221 A |
| 2,399,750 | 5/1946 | Marty | 24/221 A |
| 2,502,539 | 4/1950 | Tinnerman | 24/221 A |
| 2,542,968 | 2/1951 | Zahodiakin | 24/221 R |
| 2,670,513 | 3/1954 | Schlueter | 24/221 A |
| 3,124,993 | 3/1964 | Schlueter | 24/221 K |
| 3,755,860 | 9/1973 | Schenk | 24/221 R |
| 3,874,041 | 4/1975 | Smith | 24/221 R |

FOREIGN PATENT DOCUMENTS

| 941,822 | 1/1949 | France | 24/221 A |
|---|---|---|---|
| 794,113 | 4/1958 | United Kingdom | 24/221 A |

*Primary Examiner*—Bernard A. Gelak
*Attorney, Agent, or Firm*—Kane, Dalsimer, Kane, Sullivan and Kurucz

[57] ABSTRACT

A fastener for coupling two relatively thin members having oversized openings therein such as road guard rails which are subject to severe shear loads. The fastener includes a stud having an enlarged head portion and a body portion extending therefrom. The body portion is adapted to pass through the oversized openings and the head is adapted to engage with the surface of the adjacent thin member and is larger than the opening therein. A receptacle is provided which is adapted to interengage and disengage with the stud body between a fastened and unfastened position. At least one spiral cam slot is on the stud body and a corresponding cam surfaces on the receptacle whereby relative rotation between the stud body and receptacle will cause the cam surface to follow the cam slot between the locked and unlocked positions. A spring is positioned to be biased as the cam surface follows the spiral cam slots thereby assisting in drawing the two members into tight interengagement and retaining the stud and receptacle in fastened condition. Finally, a retainer is provided for maintaining proper orientation of the fastener when the members are subjected to a shear load so that the primary load on the fastener is a shear load thereby increasing the load therein capacity of the fastener.

12 Claims, 8 Drawing Figures

FIG. 4
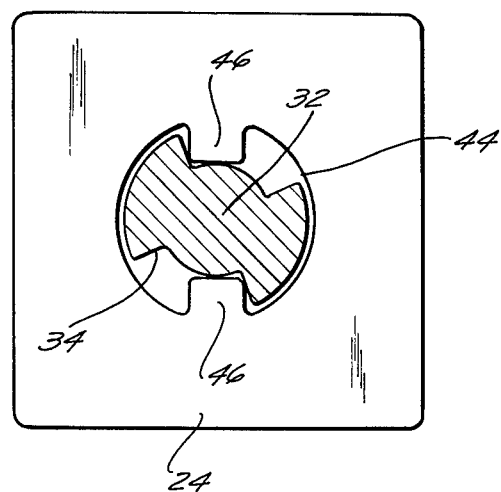
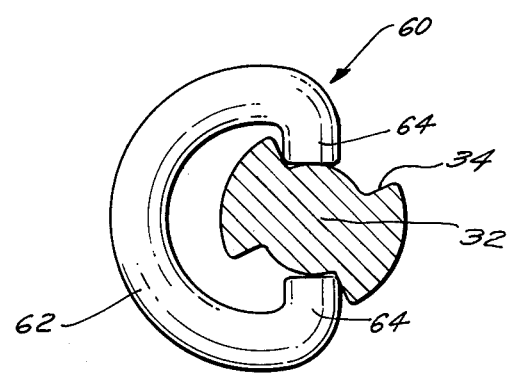
FIG. 5

FASTENER

BACKGROUND OF THE INVENTION

There are many environments in which it is desirable to have a quarter turn or quick release coupling device that can withstand high shear stresses when coupling two thin members together particularly when the thin members are provided with oversized holes for facilitating assembly and passage of the fastener therethrough. A specific example of this type of environment is in the coupling together of sections of highway guard rails that are subject to damage caused by high impact from motor vehicles tending to pull the two coupled sections apart. The guard rails are designed so that they can be assembled quickly and disassembled quickly so that a damaged section can be readily replaced.

The difficulty that arises with conventional type of fasteners employed today is that when the guard rail is struck by a vehicle, the two adjacent sections will tend to pull apart thereby rotating the fastener mounted in the corresponding slots in the two sections so as to reposition the fastener in a location that it is subjected to a tension load rather then the natural shear load to which it would have been subjected in the original position and which it is constructed to withstand. Oversized holes are conventional because they add to the ease of assembly and disassembly of the adjacent elements. Therefore, the advantage gained in assembly time is lost in rigidity since rotation of the fastener is possible. Furthermore, even if the holes were designed to be slightly larger than the fastener element therethrough, the fact that the material used for the guard rails are relatively thin in cross-section would limit their ability to prevent rotation of the fastener when the shear load is applied. It is readily apparent that additional rigidifying structure is necessary to maintain the stud in relatively fixed position so that it is properly located to withstand the shear load for which it is designed and is not rotated into a position where it is subjected to a tension load and will fail.

The traditional type of fastener element employed today for guard rail fastening is a simple bolt and nut assembly without any additional rigidifying structure to retain the assembly in position for meeting a heavy shear load. Furthermore, the threaded interengagement of bolt and nut is much more time consuming in assembly and disassembly operations, particularly where a damage section is to be replaced, than is desirable in most instances.

SUMMARY OF THE INVENTION

With the above background in mind, it is among the primary objectives of the present invention to provide a fastener designed for coupling two thin members with holes therein wherein the fastener employs structure to retain the fastener in the unrotated position so that it is able to withstand the high shear load and is not reoriented to be subjected to a tension load which could cause failure. Furthermore, the fastener is designed so that a simple quarter rotational turn is sufficient to shift the fastener between the locked and unlocked conditions thereby facilitating the disassembly of sections and replacement of damaged sections.

There are a number of alternative forms for the invention, three of which are discussed in detail and depicted in the drawings. The first form employs a four pirce assembly including a stud, retention means in the form of a flat washer to prevent too large a degree of tipping or rotating of the stud from the vertical position when subjected to shear loads, a leaf spring to facilitate appropriate axial movement of the fourth member, in the form of a receptacle, with respect to the stud when the assembly is fastened and unfastened. The second form includes a loop or ring for the receptacle member. The third form includes the spring members as part of the receptacle thereby providing a three piece assembly in place of the four piece assembly of the first two forms. Additionally the three piece assembly is designed so that the stud includes surfaces which prohibit its rotation thereby necessitating rotation of the receptacle between the locked and unlocked position for fastening and unfastening purposes.

In summary, the fastener includes a stud having an enlarged head portion and a body portion extending therefrom. The body portion is adapted to pass through the openings in the two thin members being fastened together and the head is adapted to engage with the surface of the adjacent thin member and is larger than the opening therein. A receptacle is adapted to interengage and disengage with the stud body between a fastened and unfastened position. At least one spiral cam slot is on one of the stud and receptacle and a corresponding cam surface is on the other of the stud and receptacle where by relative rotation therebetween will cause the cam surface to follow the cam slot between the locked and unlocked positions. Spring means is positioned to be biased as the cam surface follows the spiral cam slot thereby assisting in drawing the two members into tight interengagement and retaining the stud and receptacle in fastened condition. Finally, retention means is provided for retaining proper orientation of the fastener when the members are subjected to a shear load so that the primary load on the fastener is a shear load thereby increasing the load bearing capacity of the fastener.

With the above objectives among others in mind, references had to the attached drawings.

BRIEF DESCRIPTION OF THE DRAWINGS

In The Drawings:

FIG. 4 is a sectional top view thereof taken along the plane of line 4—4 of FIG. 2;

FIG. 5 is a sectional top plan view of an alternative form of the fastener with a different receptacle being employed;

DESCRIPTION OF THE PREFERRED EMBODIMENTS

Figure 1:
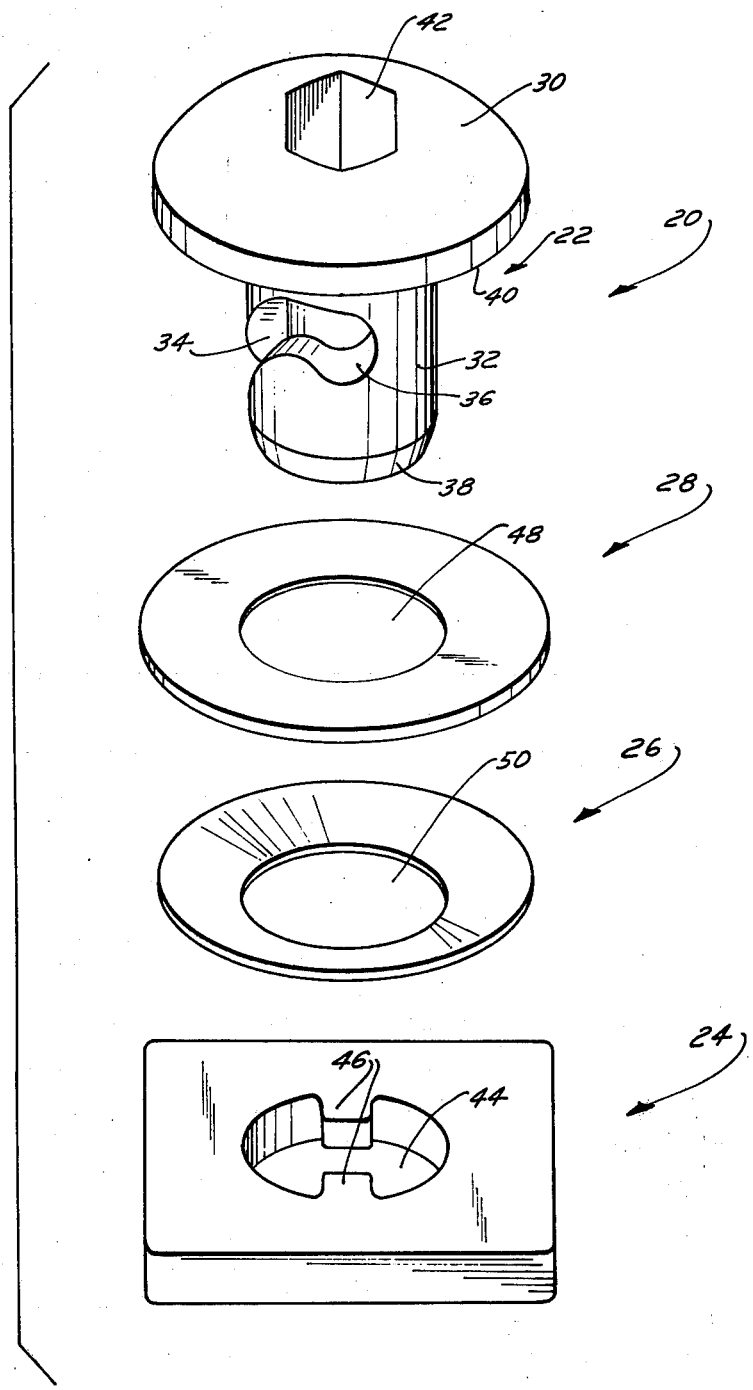
FIG. 1 is an exploded perspective view of the fastener of the invention.

Fastener 20 as shown in exploded view in FIG. 1 includes a stud member 22, a receptacle 24, a spring means or spring washer 26, and a retention means or flat washer 28.

Stud 22 has an enlarged head 30 on one end of a tubular stud body 32. A pair of proposed spiral cam slots 34 extend axially from the end of stud body 32 distal from head end 30. Each spiral cam slot terminates in a detent 36 which forms a locking detent for a cam surface or cam follower. A beveled tip 38 is provided on the stud body 32 at the end distal from head 30 to facilitate its insertion into other portions of fastener 20. The enlarged head is cylindrical in configuration and extends laterally otward from tubular body 34 to form an undersurface 40 on the head for engagement with a member to be fastened as will be discussed in detail below. On the upper surface of head 30 is a tool receiving opening such as hexagonal opening 42 which is designed to receive an appropriate tool to facilitate rotation of the stud between the fastened and unfastened positions.

The receptacle 24 of the embodiment of FIG. 1 is rectangular in configuration and includes a central aperture 44 having a pair of opposed inwardly extending tabs 46 which form cam surfaces or followers for engagement with the corresponding cam slots 34 on the stud body 32.

Two additional elements are captured between the undersurface 40 of head 30 and the receptacle 24. The first is the retention flat washer 28 which is a substantially rigid circular washer having a central aperture or opening 48 which is dimensioned so as to be slightly larger than the outer dimension of tubular body 32. In this manner, flat washer 28 can be positioned on tubular body 32 and retained in position when receptacle 24 is coupled with the stud 22. Also positioned on tubular body 32 is a resilient circular and conical spring washer 26 which also has a central aperture 50 which is slightly larger than the outer diameter of tubular portion 32 of stud 22. Therefore, the washer 26 is dimensioned to be received on stud body 32 and captured in position by coupling of the stud with receptacle 24. The conical shape of spring washer 26 is such that it is normally in a beveled or conical configuration and when subjected to an axial force it will deform into a somewhat flat configuration, and when released, its resilient nature will return the washer to the initial conical configuration.

Figure 2:
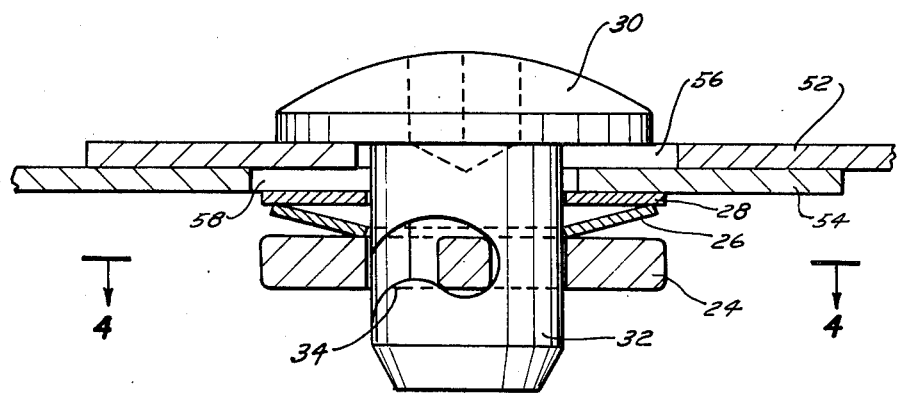
FIG. 2 is a sectional side elevation view of the fastener of the invention showing the fastener in fastened position holding two thin members together.

The fastener 20 is designed for coupling two thin walled members together and may be used with the type of corrugated sheet metal utilized in forming guard rails on highways. For illustrative purposes, the fastener will be desscribed as being used in that environment. The end of one section 52 of guard rail is overlapped with the end of an adjacent section 54. The end portions of the guard rails have respective elongated apertures 56 and 58 therein for reception of the fastener. By elongating the apertures, it is possible to effect ease of assembly since only partial alignment between apertures 56 and 58 is necessary to permit the passage of the stud therethrough. As shown in FIG. 2, the stud body 32 is passed through apertures 56 and 58 until the undersurface 40 of head 30 engages with the adjacent surface of section 52. Flat washer 28 is than passed onto stud body 32 and brought into engagement with the adjacent surface of section 54. The spring washer 26 is then positioned on stud body 32 and is brought into engagement with flat retention washer 28. The final element, the receptacle 24 is then positioned about stud body 32 and an appropriate tool is positioned in hexagonal aperture 42 and the stud is rotated relative to the receptacle. This causes tabs 46 to follow the corresponding cam slot 34 from the openings near the bottom end of the stud body into the end position of the slot 34 where the tab will be drawn into a detent 36 by the axial spring force exerted by the compressed conical leaf spring 26. The entire fastening operation can be accomplished in a quarter turn of the stud member with respect to the receptacle by the provision of quarter turn slots 34 in the stud body 32. Naturally the length of the spiral cam slots will determine the relative rotation required to extend the tabs 46 between the unfastened and fastened positions. It is contemplated that cam surfaces or followers equivalent to tabs 46 could be positioned on the stud body 32 and cam slots corresponding to slot 34 could be located on the interior surface of the aperture in the receptacle. Operation of the assembly would be identical as with the depicted embodiment. Naturally the apertures in spring members 28 would have to be large enough to receive the cam surfaces extending therethrough for engagement with the cam slots located in the receptacle.

Figure 3:
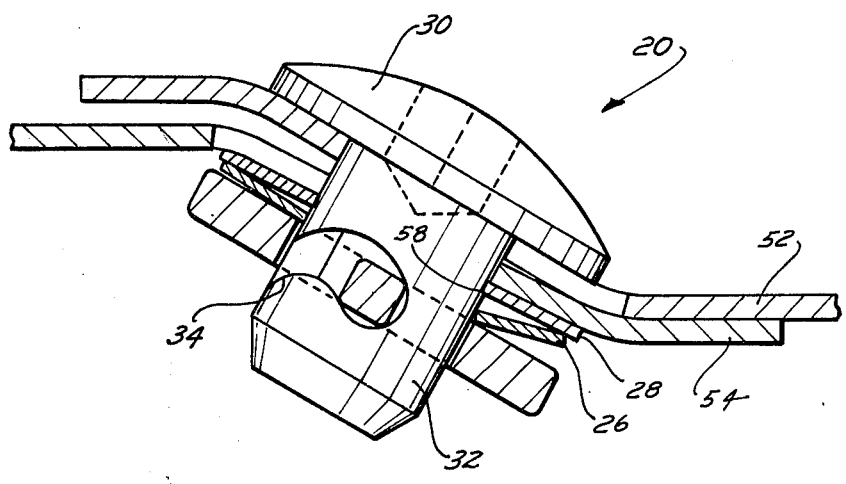
FIG. 3 is a sectional elevation view thereof showing the position of the fastener when the thin members are subjected to a high shear load.

When the guard rail sections 52 and 54 are subjected to severe shear loads such as when an automobidle goes out of control and crashes into the guard rail, the tendency is for the two sections to pull apart. This subjects the fastener 20 to a severe shear load which the fastener is designed to withstand. However, initially the tendency is for the fastener to rotate as the ends of the rail sections 45 and 52 tend to separate. This action is depicted in FIG. 3 of the drawing. If the fastener 20 is permitted to rotate to too great a degree into alignment with the rail sections the force supplied to the fastener will become primarily a tensile force and there will be greater tendency for the fastener to fail and separate in the axial direction. The fastener is designed to withstand a much higher shear load than a tensile load. Accordingly, retention means is provided to retain the fastener in a position which minimizes the degree of rotation. In the depicted embodiment this is accomplished by flat washer 28 which is captured between the conical leaf spring washer 26 and panel section 54. As shown in FIG. 3, the edge 58 of flat washer 28 which forms central opening 48 engages with the side walls of tubular body portion 32 of stud 22. Edge 58 bites into and holds the stud body 32 from further rotation and therefore limits the degree of rotation of stud 22. This holds the stud in a position whereby it still is able to handle the load as a high shear load and is not rotated to too great a degree so that it is subjected to a substantial tensile load.

Naturally when it is desired to replace a section of guard rail, whether it is damaged or not, all that need be done is to engage with opening 42 in head 30 of the stud and rotate the stud relative to receptacle 24 a quarter turn to bring cam following tabs 46 out of engagement with cam slot 34 the resilience of leaf spring 26 facilitates movement of the tabs out of the detent 36 and along the cam slot 34 until the stud 22 is free of the engaging tabs 46 in receptacle opening 44. The receptacle can then be removed from stud 22 and the stud removed from the apertures 58 and 56 in the guard rail sections and a new section can be inserted and coupled in a similar fashion as described above. Once again, it is only necessary to rotate the fastener assembly a quarter turn and the new section is fastened in place. Naturally the section must be fastened at both ends by an appropriate fastener 20 to the adjoining rail sections. The number of fastener 20 holding two adjacent end portions together is a matter of choice, however, one is shown in the depicted embodiment.

FIG. 5 depicts in an alternative form of receptacle 60. It is designed to couple with stud 22 and springs 26 and 28 in an identical manner as receptacle 24. However, the configuration of the receptacle is in the form of a semi-circular ring 62 terminating in two inwardly extending tabs 64 which correspond to tabs 46 on rectangular receptacle 24.

The intend of the fastener assembly is to provide a quarter turn coupling device that will take high shear in this sections with oversized holes while coupling the two thin members together by limited tension. One specific use is for coupling together sections of highway guard rail that are subject to damage and require a coupling device that provides for speed of assembly and disassembly so that the damaged section can be readily replaced.

The stud is inserted through the aligned openings in the panels and the flat washer is placed over the end of the stud.

The flat washer has a hole only slightly larger than the stud diameter so that any tilt of the washer relative to the stud will bind the washer on the stud. Behind the flat washer is placed a spring element or washer. The purpose of the spring is to provide grip length compensation and also to provide detent locking in the spiral groove. The receptacle is inserted over the stud end and the cam tabs engage the spiral slots in the stud. Rotation of the receptacle or stud will further engage the stud and receptacle to detent position. While doing this, the spring element is being compressed pulling together the two panels. It is obvious that the application of a high shear load on the sections will tend to rotate the perpendicular position of the stud relative to the panels. When this occurs, the shear load through the bolt is converted to a tension load trying to separate the panels. The present coupling device provides for greater tension capability than normally possible by means of the cam tabs on the receptacle and the spiral grooves on the stud by use of the limited clearance between the retention flat washer and the stud. As soon as tilting of the stud occurs through applications of high shear load, it tilts relative to the washer, binding the washer to the stud.

Figure 6:
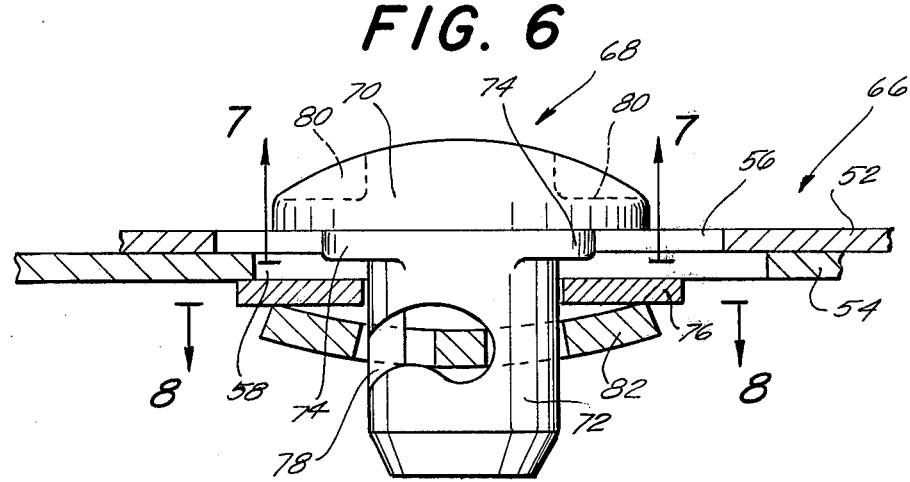
FIG. 6 is a sectional side elevation view of a second alternative form of the fastener of the invention showing the fastener in fastened position holding two thin members together.
Figure 7:
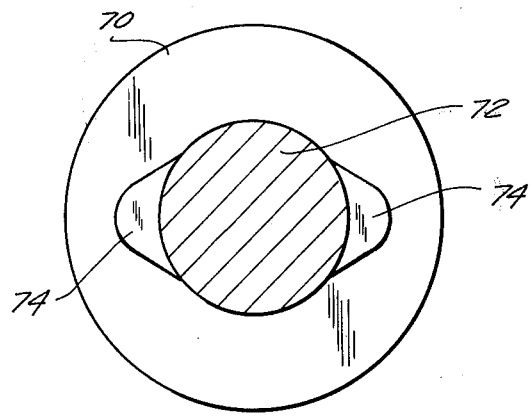
FIG. 7 is a sectional bottom view thereof taken along the plane of line 7—7 of FIG. 6.
Figure 8:
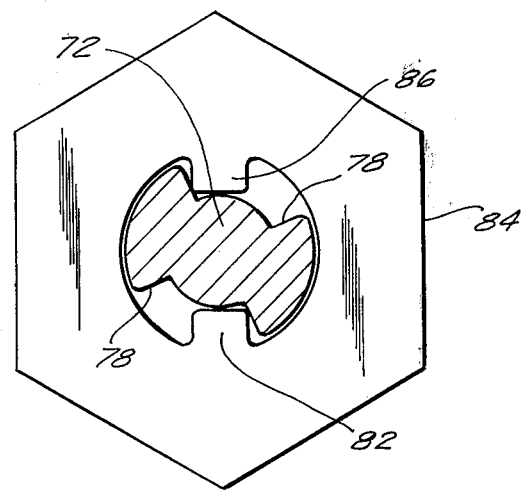
FIG. 8 is a sectional top view thereof taken along the plane of line 8—8 of FIG. 6.

A second alternative form of the fastener assembly is shown in FIGS. 6-8 with the fastener 66 in FIG. 6 showing its use in fastening the same two thin members 52 and 54 together. The stud portion 68 of the fastener is somewhat similar in configuration and use. It includes an enlarged head 70 and a reduced diameter cylindrical body portion 72. Formed on the stud 68 at the point where the body 72 meets the head 70 as a pair of opposed bumps or flanges 74 which may be mounted on the stud or formed integrally therewith as shown in the depicted stud. The bumps serve as engagement surface with at least one of the enlarged openings 56 and 58 in members 52 and 54. When stud 68 is properly oriented it can be inserted through openings 56 and 58 until the undersurface of head 70, which is larger than the opening, engages with the exposed surface of member 52. The openings will receive flanges 74 therein. However, an attempt to rotate stud 68 with respect to members 52 will not be successful since flange 74 will engage with the surface forming the opening thereby preventing rotation. The type of rotation referred to is rotation about the longitudinal axis of the stud. Rotation about the lateral axis of the stud or tipping of the stud from its normal vertical orientation, as shown, is limited by the retention washer 76 in the same manner as the way flat washer 28 prevents tipping or rotation about the lateral axis of the stud of the first discussed embodiment.

The body 72 of stud 68 has a spiral cam slot 78 adjacent its free end for acceptance of the receptacle in the same manner as the stud of the first discussed embodiment.

The exposed surface of the head 70 above panel 52 does not have surfaces for reception of a tool to rotate the stud since the stud is prevented from rotation by means of flanges 74. There are a pair of opposed notches 80 in the head 70 and these are for purposes of facilitating formation of the stud and handling of the stud prior to use in holding members 52 and 54 together.

The retention means or washer 76 can be a round flat washer as discussed with respect to washer 28 or, alternatively, it can be a square shaped washer having a square shaped perimeter. For purposes of discussing the embodiment of FIGS. 6-8, washer 76 has a square shaped outer perimeter.

The receptacle 82 serves a number of functions in the embodiment of FIGS. 6-8. Initially it has a hexagonally shaped outer perimeter for engagement by an appropriate tool to rotate receptacle 82 with respect to the fixed stud 68 in fastening and unfastening the device. Additionally, receptacle 82 is in the form of a leaf spring which is similar to and acts like the leaf spring 26 of the first discussed embodiment. The receptacle 82 has a pair of inwardly extending tabs 86 which function as the tabs extending inwardly from receptacle 24 of the first discussed embodiment for engagement and rotation in spiral cam slot 78.

Accordingly, in use, stud 68 is inserted through openings 56 and 58 locating flanges 74 in position to prevent further axial rotation of the stud. Flat washer 76 is then positioned on the stud body and is brought into engagement with the undersurface of member 54. The receptacle 82 is then positioned on the stud body with tabs 86 in alignment with spiral cam slot 78. Thereafter, an appropriate tool fitting the hexagonal shape of receptacle 82 is engaged with the receptacle and it is rotated thereby causing tabs 86 to follow cam slot 78 into the locking position. The axial movement of this action to provide tight interengagement between the receptacle and the stud holding the members 52 and 54 and washer 76 therebetween is accommodated by the resiliency of leaf spring receptacle 82.

Rotation of the receptacle continues for an appropriate amount such as a quarter turn for the depicted embodiment at which time the fastener is locked and in use in holding the members 52 and 54 together. Thereafter the fastener operates in a similar manner as in the previously discussed embodiments whereupon tipping of the stud or rotation about its lateral axis is limited by engagement with the retention washer 76 when the assembly is subjected to high shear loads. In this manner the fastener acts in the most effective manner to retain the members 52 and 54 in fastened condition.

Disassembly is accomplished in a quick and easy fashion by engaging the appropriate hexagonally shaped tool with receptacle 82 and rotating the receptacle a quarter turn in the opposite direction freeing the tab 86 from the cam slot 78 whereupon the receptacle 82 and flat washer 76 can be removed from the stud and the stud can be removed from members 52 and 54.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A fastener for coupling two relatively thin members with each member having an elongated opening therein and adapted to be placed in overlapping relationship with the elongated openings being in at least partially aligned position with respect to one another and the members being subject to severe shear loads comprising:

a stud having an enlarged head portion and a body portion extending therefrom and means in the head of the stud for reception of a tool to facilitate rotation of the stud between the fastened and unfastened positions;

the body portion being adapted to pass through the openings and the head being adapted to engage with the surface of the adjacent thin member and being larger than the opening therein;

a receptacle adapted to interengage and disengage with the stud body between the fastened and unfastened positions;

at least one spiral cam slot on one of the stud and receptacle and a corresponding cam surface on the other of the stud and receptacle whereby relative rotation therebetween will cause the cam surface to follow the cam slot between the fastened and unfastened positions, each spiral cam slot terminating in a detent for facilitating retention of the cam surface when the stud and receptacle are in the fastened position;

spring means positioned to be biased as the cam surface follows the spiral cam slot thereby assisting in drawing the two members into tight interengagement and retaining the stud and receptacle in fastened condition;

retention means for tending to retain the proper orientation of the fastener when the members are subjected to a shear load and to assume a substantial portion of tension load applied to the fastener so that the primary load on the coupled stud and receptacle is a shear load thereby increasing the load bearing capacity of the fastener, the retention means including a rigid washer of hard material and having a central aperture for passage of the stud body therethrough and the aperture being slightly larger in diameter than the outer diameter of the stud to provide a close fitting relationship, the surfaces forming the aperture having sharp edges so that when the stud body is passed through the two members to be fastened and the rigid washer is positioned on the stud body between the members to be fastened and the receptacle, the spring means will be resiliently deformable to permit rotation of the stud and corresponding movement of the cam surface along the cam slot between the locked and unlocked positions and the rigid washer will be positioned so that when the stud is subjected to a shear load and is rotationally biased the rigid washer will bite into the stud and will assist in retaining the stud from rotational movement thereby maintaining the coupled stud and receptacle in position for primary subjection to a shear load in contrast to a tension load.

2. The invention in accordance with claim 1 wherein the spiral cam slot is in the body portion of the stud at the end distal from the head portion of the stud and the cam surface includes an inwardly extending tab and the receptacle positioned to engage with the spiral cam slot in the stud.

3. The invention in accordance with claim 2 wherein there are two diametrically opposed cam slots in the stud body and two diametrically opposed inwardly extending tabs in the receptacle with each tab being positioned to engage and disengage with a corresponding cam slot in the stud.

4. The invention in accordance with claim 3 wherein the receptacle is rectangular in configuration and has an aperture therein for reception of the stud body therethrough.

5. The invention in accordance with claim 1 wherein the spiral cam slot is of a predetermined length so that a one quarter rotational turn is sufficient to shift the stud between the fastened and unfastened positions.

6. The invention in accordance with claim 1 wherein the spring means includes a spring washer having a central aperture for passing the stud body therethrough.

7. The invention in accordance with claim 1 wherein the receptacle is in the form of a ring interrupted at a portion thereof to form two terminal edges which correspond to cam surfaces for interengagement with a pair of opposing cam slots in the end of the stud body distal from the head end so that relative rotation of the stud with respect thereto will cause the ends to shift in the cam slots between the locked and unlocked positions.

8. The invention in accordance with claim 1 wherein the two members to be fastened are thin corrugated guard rails with each guard rail having an elongated opening therein and the openings in the guard rail is adapted to be placed into at least partial corresponding positions relative to each other.

9. The invention in accordance with claim 1 wherein the receptacle has an hexagonally-shaped perimeter surface.

10. The invention in accordance with claim 1 wherein stop means is on the stud to prevent rotation of the stud relative to the members being fastened when the stud is positioned in the openings in the two members being fastened.

11. The invention in accordance with claim 1 wherein the stop means includes a pair of opposing laterally extending flanges on the stud located at the point where the stud body meets the head so that when the stud body and flanges are inserted into the members being fastened the flanges will engage with surfaces forming the opening in at least one of the members and prevent rotation of the stud whereby rotation of the receptacle relative to the stud will lock and unlock the fastener.

12. The invention in accordance with claim 1 wherein the rigid washer of the retention means has a square shaped outer perimeter surface.

* * * * *